United States Patent
Nunokawa et al.

(10) Patent No.: US 11,557,774 B2
(45) Date of Patent: Jan. 17, 2023

(54) METAL SEPARATOR

(71) Applicant: HONDA MOTOR CO., LTD., Tokyo (JP)

(72) Inventors: Kazuo Nunokawa, Wako (JP); Yasunori Murakami, Wako (JP)

(73) Assignee: Honda Motor Co., Ltd., Tokyo (JP)

(*) Notice: Subject to any disclaimer, the term of this patent is extended or adjusted under 35 U.S.C. 154(b) by 44 days.

(21) Appl. No.: 17/198,559

(22) Filed: Mar. 11, 2021

(65) Prior Publication Data

US 2021/0288340 A1    Sep. 16, 2021

(30) Foreign Application Priority Data

Mar. 13, 2020 (JP) .............................. JP2020-043779

(51) Int. Cl.
| | |
|---|---|
| *H01M 8/0284* | (2016.01) |
| *H01M 8/0276* | (2016.01) |
| *H01M 8/0206* | (2016.01) |
| *H01M 8/10* | (2016.01) |

(52) U.S. Cl.
CPC ....... *H01M 8/0284* (2013.01); *H01M 8/0206* (2013.01); *H01M 8/0276* (2013.01); *H01M 2008/1095* (2013.01)

(58) Field of Classification Search
None
See application file for complete search history.

(56) References Cited

U.S. PATENT DOCUMENTS

| | | | |
|---|---|---|---|
| 7,674,550 B2 * | 3/2010 | Wakahoi ............. | H01M 8/0271 429/465 |
| 2013/0122390 A1 * | 5/2013 | Blunk ................. | H01M 8/0286 429/465 |
| 2017/0226392 A1 * | 8/2017 | Luong ................. | H01M 8/1004 |
| 2018/0212259 A1 | 7/2018 | Yang et al. | |
| 2019/0296370 A1 * | 9/2019 | Koga ................... | H01M 8/0271 |

* cited by examiner

*Primary Examiner* — Alix E Eggerding
(74) *Attorney, Agent, or Firm* — Carrier Shende & Associates, P.C.; Joseph P. Carrier; Fulchand P. Shende (57) ABSTRACT

A metal separator is applied to a fuel cell. A method of producing the metal separator involves performing a plate processing step of forming a bead base, and a rubber seal forming step of providing a rubber seal by screen printing for the bead base formed in the plate processing step. The rubber seal forming step includes a first protrusion forming step of forming a first protrusion at the central part in the width direction of a top portion of the bead base, in a cross sectional view taken along a thickness direction of the rubber seal, and a second protrusion forming step of forming a second protrusion configured to cover the first protrusion after the first protrusion forming step.

5 Claims, 7 Drawing Sheets

METAL SEPARATOR

CROSS-REFERENCE TO RELATED APPLICATION

This application is based upon and claims the benefit of priority from Japanese Patent Application No. 2020-043779 filed on Mar. 13, 2020, the contents of which are incorporated herein by reference.

BACKGROUND OF THE INVENTION

Field of the Invention

The present invention relates to a metal separator applied to a fuel cell, and a method of producing the metal separator.

Description of the Related Art

A fuel cell includes a membrane electrode assembly (MEA) and a pair of metal separators (bipolar plates) sandwiching the MEA. The MEA is formed by stacking an anode, a solid polymer electrolyte membrane, and a cathode together. The metal separator has a flow field as a passage of a reactant gas used in power generation, at a position where the metal separator and the MEA contact together. Further, a seal is formed between the metal separator and the MEA to prevent leakage of a reactant gas.

In some of metal separators of this type, a metal bead (bead base) protrudes integrally from a separator surface (see the specification of U.S. Patent Application Publication No. 2018/0212259). Further, a micro seal (rubber seal) is provided by screen printing, on a top portion of the bead base of the metal separator disclosed in the specification of U.S. Patent Application Publication No. 2018/0212259.

SUMMARY OF THE INVENTION

In this regard, the rubber seal provided on the bead base of the metal separator is configured to have a sufficient thickness (membrane thickness) to obtain suitable seal performance. However, in the case of forming the rubber sealing to have a large thickness by screen printing as disclosed in the specification of U.S. Patent Application Publication No. 2018/0212259, it is difficult to control the thickness itself, and the flatness of the protruding end surface (range of the flat portion and the height difference) of the rubber seal. In the case where the thickness of the rubber seal is unstable, and the area of the flat portion is small, seal failures may occur at the time of stacking the metal separators and the MEA together.

The present invention has been made taking the above problems into account, and an object of the present invention is to provide a metal separator and a method of producing the metal separator capable of achieving the stable seal performance by forming a thick rubber seal and achieving suitable flatness of a protruding end surface.

In order to achieve the above object, according to a first aspect of the present invention, provided is a metal separator to be applied to a fuel cell, the metal separator including a bead base protruding from a surface of the metal separator, and formed integrally with the metal separator, and a rubber seal provided on the bead base, wherein, in a cross sectional view taken along a thickness direction of the rubber seal, the rubber seal includes a first protrusion at a central part in a width direction of a top portion of the bead base, and a second protrusion provided outside the first protrusion and configured to cover the first protrusion.

Further, in order to achieve the above object, according to a second aspect of the present invention, provided is a metal separator to be applied to a fuel cell, the metal separator including a bead base protruding from a surface of the metal separator, and formed integrally with the metal separator, and a rubber seal provided on the bead base, wherein, in a cross sectional view taken along a thickness direction of the rubber seal, the rubber seal includes a protrusion over a top portion of the bead base entirely in a width direction of the top portion, a depressed portion is formed at an upper and widthwise central part of the protrusion, and the rubber seal includes a filler portion configured to cover the depressed portion.

Further, in order to achieve the above object, according to a third aspect of the present invention, a method of producing a metal separator to be applied to a fuel cell is provided. The method includes a plate processing step of forming a bead base protruding from a surface of the metal separator, and formed integrally with the metal separator, and a rubber seal forming step of providing a rubber seal by screen printing for the bead base formed in the plate processing step. The rubber seal forming step includes a first protrusion forming step of forming a first protrusion at the central part in the width direction of a top portion of the bead base, in a cross sectional view taken along a thickness direction of the rubber seal, and a second protrusion forming step of forming a second protrusion provided outside the first protrusion and configured to cover the first protrusion, after the first protrusion forming step.

In the metal separator and the method of producing the metal separator, by forming the thick rubber seal and achieving suitable flatness of the protruding end surface, it is possible to achieve the stable seal performance.

The above and other objects, features and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Hereinafter, preferred embodiments of the present invention will be described in detail with reference to the accompanying drawings.

First Embodiment

Figure 1:
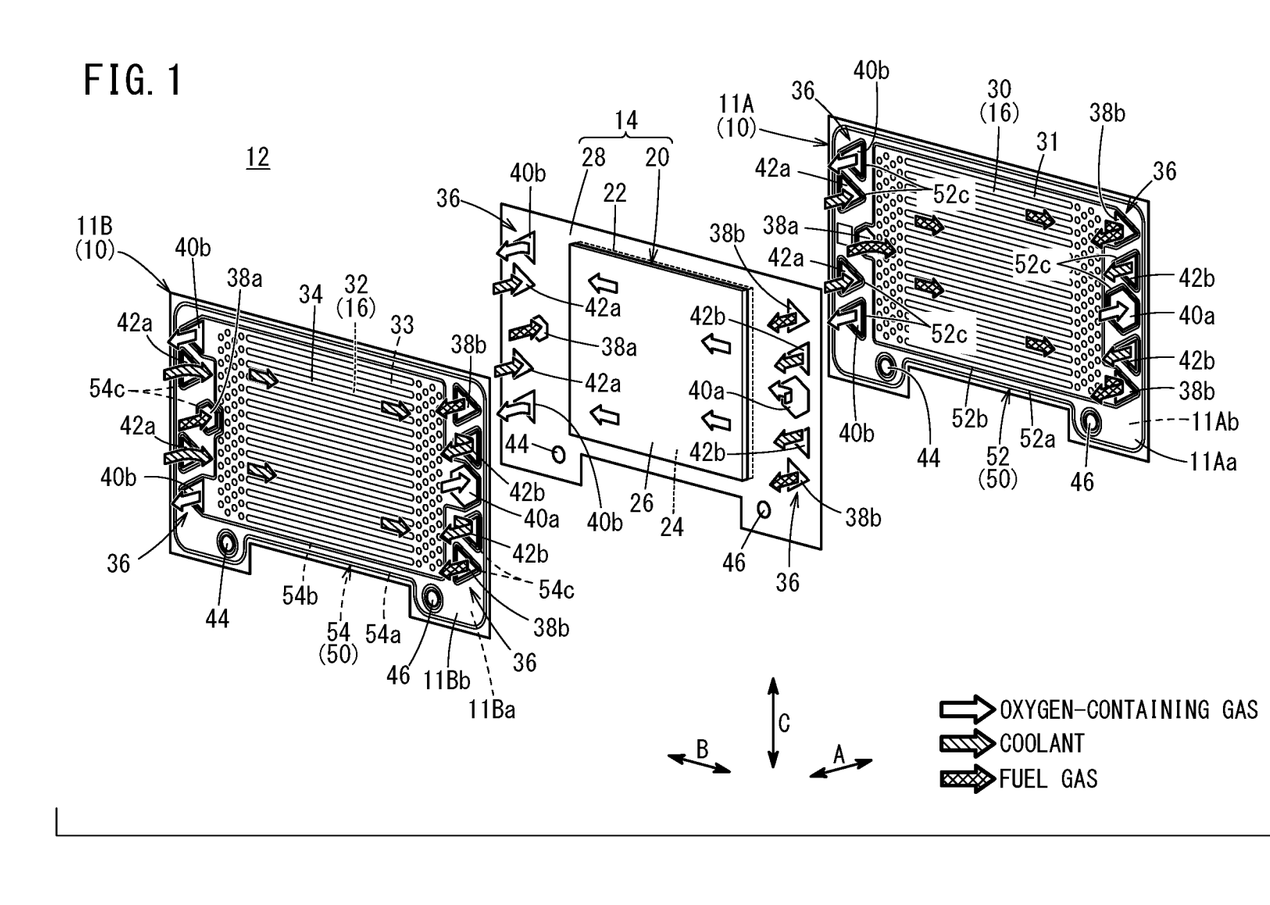
FIG. 1 is an exploded perspective view showing a fuel cell to which a metal separator according to a first embodiment of the present invention is applied.

As shown in FIG. 1, a metal separator 10 according to a first embodiment of the present invention is applicable to a fuel cell 12 (power generation cell, unit cell). The fuel cell 12 is formed by sandwiching a resin frame equipped membrane electrode assembly 14 (hereinafter referred to as the resin frame equipped MEA 14) between a pair of metal separators 10 (11A, 11B). In the fuel cell 12, a fuel gas such as hydrogen flows between one of the metal separators (metal separator 11A) and the resin frame equipped MEA 14, and an oxygen-containing gas such as oxygen flows between the other of the metal separators (metal separator 11B) and the resin frame equipped MEA 14, whereby power generation is performed by electrochemical reactions of the fuel gas and the oxygen-containing gas.

For example, the fuel cell 12 has a rectangular shape laterally (or longitudinally) elongated in a direction indicated by an arrow B. A plurality of the fuel cells 12 are prepared, and stacked together in a direction indicated by an arrow A to form a fuel cell stack (not shown). For example, the fuel cell stack is mounted as an in-vehicle fuel cell in a fuel cell vehicle.

The resin frame equipped MEA 14 includes a membrane electrode assembly 20 (hereinafter referred to as the "MEA 20", and a resin frame member 28 which is joined to an outer peripheral portion of the MEA 20 in the direction indicated by the arrow B and in a direction indicated by an arrow C, and provided around the outer peripheral portion. The metal separator 10 and the resin frame equipped MEA 14 jointly form the fuel cell 12. It should be noted that the fuel cell 12 may not employ the resin frame member 28, and may have a structure where an electrolyte membrane 22 described later protrudes toward the outside of electrodes 24, 26 (in the direction indicated by the arrow B and in the direction indicated by the arrow C.

The MEA 20 includes the electrolyte membrane 22, an anode 24, provided on one surface of the electrolyte membrane 22, and a cathode 26 provided on the other surface of the electrolyte membrane 22. For example, the electrolyte membrane 22 is a solid polymer electrolyte membrane (cation ion exchange membrane). For example, the sold polymer electrolyte membrane is a thin membrane of perfluorosulfonic acid containing water. A fluorine based electrolyte may be used as the electrolyte membrane 22. Alternatively, an HC (hydrocarbon) based electrolyte may be used as the electrolyte membrane 22.

Each of the anode 24 and the cathode 26 has an electrode catalyst layer (not shown) joined to one surface of the electrolyte membrane 22, and a gas diffusion layer (not shown) stacked on the electrode catalyst layer. The electrode catalyst layer is formed by depositing porous carbon particles uniformly on the surface of the gas diffusion layer together with ion conductive polymer binder, and platinum alloy is supported on surfaces of the carbon particles. Each of the gas diffusion layer comprises a carbon paper, a carbon cloth, etc.

The resin frame member 28 is in the form of a film having a constant thickness. The inner circumference of the resin frame member 28 is held between an outer peripheral portion of the anode 24 and an outer peripheral portion of the cathode 26. In the resin frame member 28, the area where the electrolyte membrane 22 is formed is reduced to reduce the production cost, and the contact pressure between the metal separator 10 and the resin frame member 28 is adjusted suitably. Examples of materials of the resin frame member 28 include PPS (polyphenylene sulfide), PPA (polyphthalamide), PEN (polyethylene naphthalate), PES (polyethersulfone), LCP (liquid crystal polymer), PVDF (polyvinylidene fluoride), a silicone resin, a fluororesin, m-PPE (modified polyphenylene ether) resin, PET (polyethylene terephthalate), PBT (polybutylene terephthalate), or modified polyolefin.

The metal separator 10 is formed by press forming of a metal thin plate to have a corrugated shape in cross section and a wavy shape on the surface. For example, the metal plate is a steel plate, a stainless steel plate, an aluminum plate, a plated steel plate, or a metal plate having an anti-corrosive surface by surface treatment. Although not limited, for example, the thickness of the metal separator 10 may be set in the range of 50 μm to 500 μm, and set to about 100 μm in the embodiment of the present invention.

As described above, the pair of metal separators 10 form a reactant gas flow field 16 for allowing a reactant gas (the fuel gas or the oxygen-containing gas) to flow along a surface direction of the resin frame equipped MEA 14. Hereinafter, the metal separator 10 stacked on one surface of the resin frame equipped MEA 14 will also be referred to as the first separator 11A, and the metal separator 10 stacked on the other surface of the resin frame equipped MEA 14 will also be referred to as the second separator 11B. The first separator 11A of one of the fuel cells 12 and the second separator 11B of the other of the fuel cells 12 contact together when the fuel cells 12 are stacked together. Therefore, when the plurality of fuel cells 12 are stacked together, the outer circumference of the first separator 11A and the outer circumference of the second separator 11B are joined together by welding, brazing, and crimping, etc. to form a joint separator, and the joint separator is stacked on the resin frame equipped MEA 14.

The first separator 11A has a fuel gas flow field 30 (reactant gas flow field 16) as a passage of the fuel gas, on its surface 11Aa facing the anode 24 of the resin frame equipped MEA 14. The fuel gas flow field 30 is formed by straight flow grooves (or wavy flow grooves) formed between a plurality of rising portions 31 extending in the direction indicated by the arrow B (horizontal direction) of the first separator 11A.

The second separator 11B has an oxygen-containing gas flow field 32 (reactant gas flow field 16) as a passage of the oxygen-containing gas, on its surface 11Ba facing the cathode 26 of the resin frame equipped MEA 14 (in FIG. 1, for convenience, the flow direction of the oxygen-containing gas is shown on the cathode 26). The oxygen-containing gas flow field 32 is formed by straight flow grooves (or wavy flow grooves) formed between a plurality of ridges 33 extending in the direction indicated by the arrow B (horizontal direction) of the second separator 11B.

Further, a coolant flow field 34 as passage of a coolant (e.g., water) is formed between a surface 11Ab of the first separator 11A and a surface 11Bb of the second separator 11B which contact each other. When the back surface of the fuel gas flow field 30 of the first separator 11A and the back surface of the oxygen-containing gas flow field 32 of the second separator 11B are stacked together, the coolant flow field 34 is formed between the first separator 11A and the second separator 11B.

A plurality of fluid passages 36 are provided in the fuel cell 12 (the first separator 11A, the second separator 11B, and the resin frame member 28), for allowing the oxygen-containing gas and the coolant to flow in the direction indicated by the arrow A. At one end of the fuel cell 12 in the long side direction (in the direction indicated by the arrow B), as fluid passages 36, one fuel gas supply passage 38a, two oxygen-containing gas discharge passages 40b, and two coolant supply passages 42a are provided. The fuel gas supply passage 38a, the two oxygen-containing gas discharge passages 40b, and the two coolant supply passages 42a extend through each of the first separator 11A, the second separator 11B, and the resin frame member 28 in the direction indicated by the arrow A.

The fuel gas supply passage 38a is formed at the center of the five fluid passages 36 arranged in an upper/lower direction (direction indicated by the arrow C). The fuel gas supply passage 38a is connected to the fuel gas flow field 30 of the first separator 11A, for allowing the fuel gas to flow into the fuel gas flow field 30.

The two coolant supply passages 42a are provided adjacent, above and below, to the fuel gas supply passage 38a in a manner that the fuel gas supply passage 38a is positioned between the two coolant supply passages 42a. Each of the coolant supply passages 42a is connected to the coolant flow field 34 between the first separator 11A and the second separator 11B for allowing the coolant to flow into the coolant flow field 34.

The two oxygen-containing gas discharge passages 40b are positioned above the upper coolant supply passage 42a and below the lower coolant supply passage 42a, respectively. The fuel gas supply passage 38a and the two coolant supply passages 42a are positioned between the two oxygen-containing gas discharge passages 40b. Each of the oxygen-containing gas discharge passages 40b is connected to the oxygen-containing gas flow field 32 of the second separator 11B, and allows the oxygen-containing gas to flow from the oxygen-containing gas flow field 32.

At the other end of the fuel cell 12 in the long side direction (in the direction indicated by the arrow B), as fluid passages 36, one oxygen-containing gas supply passage 40a, two fuel gas discharge passages 38b, and two coolant discharge passages 42b are provided. The oxygen-containing gas supply passage 40a, the two fuel gas discharge passages 38b, and the two coolant discharge passages 42b extend through each of the first separator 11A, the second separator 11B, and the resin frame member 28 in the direction indicated by the arrow A.

The oxygen-containing gas supply passage 40a is formed at the center of the five fluid passages 36 arranged in the direction indicated by the arrow C. The oxygen-containing gas supply passage 40a is connected to the oxygen-containing gas flow field 32 of the second separator 11B, for allowing the oxygen-containing gas to flow into the oxygen-containing gas flow field 32.

The two coolant discharge passages 42b are provided adjacent, above and below, to the oxygen-containing gas supply passage 40a in a manner that the oxygen-containing gas supply passage 40a is positioned between the two coolant discharge passages 42b. Each of the coolant discharge passages 42b is connected to the coolant flow field 34 between the first separator 11A and the second separator 11B for allowing the coolant to flow into the coolant flow field 34.

The two fuel gas discharge passages 38b are positioned above the upper coolant discharge passage 42b and below the lower coolant discharge passage 42b, respectively. The oxygen-containing gas supply passage 40a and the two coolant discharge passages 42b are positioned between the two fuel gas discharge passages 38b. Each of the fuel gas discharge passages 38b is connected to the fuel gas flow field 30 of the first separator 11A, and allows the fuel gas to flow from the fuel gas flow field 30.

It should be noted that the positions, the numbers, and the shapes of the fluid passages 36 (the fuel gas supply passage 38a, the fuel gas discharge passage 38b, the oxygen-containing gas supply passage 40a, the oxygen-containing gas discharge passage 40b, the coolant supply passage 42a, and the coolant discharge passage 42b) can be determined as necessary depending on the required specification. Further, the fuel cell 12 includes, as the other fluid passages 36, a first drain hole 44 and a second drain hole 46 penetrating through each of the first separator 11A, the second separator 11B, and the resin frame member 28 in the direction indicated by the arrow A. During power generation of the fuel cell 12, the water produced at the cathode is discharged through the first drain hole 44. During power generation of the fuel cell 12, the water produced at the anode is discharged through the second drain hole 46.

Further, a first bead 52 (seal bead 50) is formed on the surface 11Aa of the first separator 11A. The first bead 52 (seal bead 50) protrudes integrally from the first separator 11A toward the resin frame equipped MEA 14, and contacts the resin frame member 28 to form a seal. The first bead 52 includes an outer bead 52a formed adjacent, and around an outer marginal portion of the first separator 11A, and an inner bead 52b formed around the fuel gas flow field 30, the fuel gas supply passage 38a, and the fuel gas discharge passages 38b, inside the outer bead 52a. Further, the first bead 52 includes, between the outer bead 52a and the inner bead 52b, passage beads 52c surrounding the oxygen-containing gas supply passage 40a, the oxygen-containing gas discharge passages 40b, the coolant supply passages 42a, the coolant discharge passages 42b, the first drain hole 44, and the second drain hole 46, respectively.

Further, a second bead 54 (seal bead 50) is formed on the surface 11Ba of the second separator 11B. The second bead 54 (seal bead 50) protrudes integrally from the second separator 11B toward the resin frame equipped MEA 14, and contacts the resin frame member 28 to form a seal. The second bead 54 includes an outer bead 54a formed adjacent, and around an outer marginal portion of the second separator 11B, and an inner bead 54b formed around the oxygen-containing gas flow field 32, the oxygen-containing gas supply passage 40a, and the oxygen-containing gas discharge passages 40b, inside the outer bead 54a. Further, the second bead 54 includes, between the outer bead 54a and the inner bead 54b, passage beads 54c surrounding the fuel gas supply passage 38a, the fuel gas discharge passages 38b, the coolant supply passages 42a, the coolant discharge passages 42b, the first drain hole 44, and the second drain hole 46, respectively.

Figure 2A:
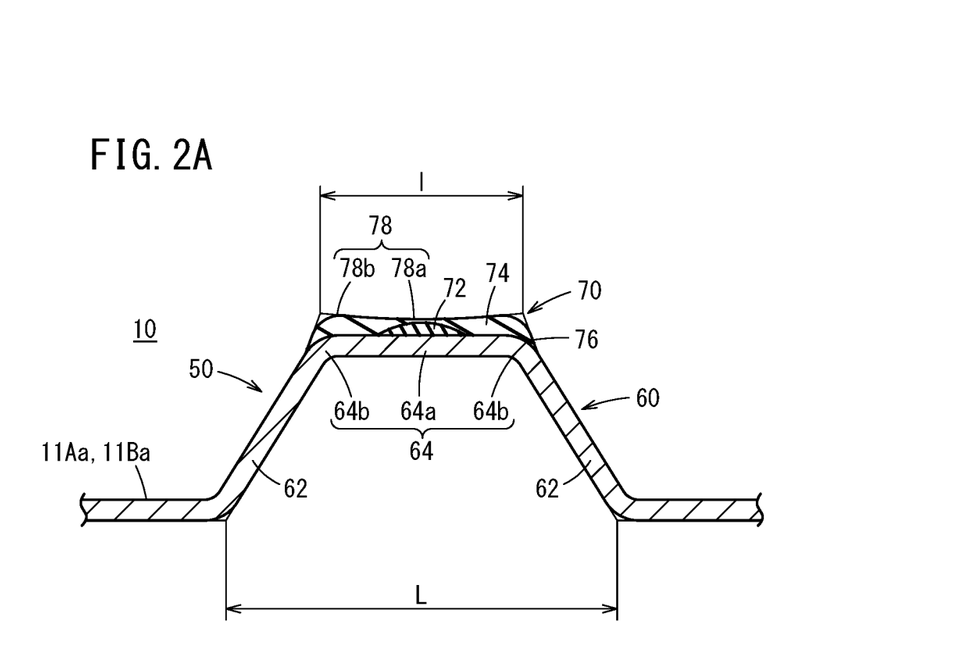
FIG. 2A is a cross sectional view showing a seal bead.

As shown in FIG. 2A, in a cross sectional view taken along the thickness direction of the metal separator 10, the seal bead 50 (the first bead 52 and the second bead 54) has a substantially trapezoidal shape. This seal bead 50 includes a bead base 60 protruding from the surface 11Aa, 11Ba of the metal separator 10 and formed integrally with the metal separator 10, and a rubber seal 70 (micro seal) provided on the bead base 60.

Specifically, the bead base 60 includes a pair of inclined portions 62 continuous with the metal separator 10, and a top portion 64 bridging upper ends of the pair of inclined portions 62. The bead base 60 has a symmetrical shape about the central part in the width direction of the top portion 64. The thickness of the pair of inclined portions 62 and the top portion 64 substantially matches the thickness of the other portion of the metal separator 10 (e.g., 50 μm to 200 μm).

In the embodiment of the present invention, the top portion 64 includes a flat portion 64a which is substantially in parallel with the surface 11Aa, 11Ba of the metal separator 10, and a pair of curved portions 64b positioned on both sides of the flat portion 64a in the width direction, and continuous with the pair of inclined portions 62, respectively. It should be noted that the bead base 60 may have structure where the top portion 64 has a circular arc shape. Further, the bead base 60 (the pair of inclined portions 62 and the top portion 64) may have a circular arc shape as a whole. The bead base 60 may have a non-symmetrical shape in cross section.

The width of the root portion of the bead base 60 (the distance L between the positions where the inclined portions 62 are connected to the surface 11Aa, 11Ba of the metal separator 10) is set, e.g., in the range of about 2.0 mm to 4.0 mm. The width of the top portion 64 of the bead base 60 (the distance 1 between the positions where the inclined portions 62 are connected to the top portion 64) is set, e.g., in the range of about 1.0 mm to 3.5 mm. Further, the protruding height of the bead base 60 is set in the range of 10% to 35% of the width of the bead base 60. The bead base 60 and the reactant gas flow field 16 of the metal separator 10 are formed at the same time by press forming. It should be noted that the bead base 60 may be formed in another step which is separate from the step of forming the reactant gas flow field 16

Figure 2B:
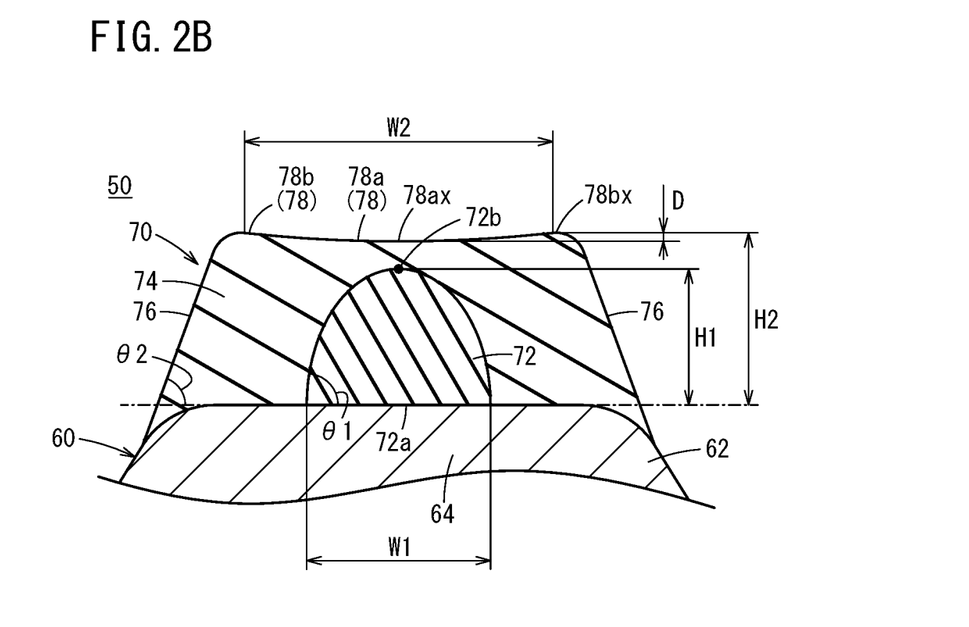
FIG. 2B is a cross sectional view schematically showing a rubber seal of the seal bead.

On the other hand, as shown in FIGS. 2A and 2B, in the cross sectional view taken along the thickness direction of the metal separators 10, the rubber seal 70 is provided so as to protrude beyond the top portion 64 of the bead base 60 after the bead base 60 is formed. The rubber material in the liquid state (gel, semi-solid state) is coated on the bead base 60 by screen printing and hardened, whereby the rubber seal 70 having a substantially trapezoidal shape with a suitable thickness (membrane thickness) is formed.

In order to increase the sealing performance of the first bead 52 and the second bead 54, the membrane thickness of the rubber seal 70 is formed to be sufficiently larger than the thickness (not more than 10 μm) of ink coated by normal relief printing. For example, the membrane thickness of the rubber seal 70 (distance from the top portion 64 of the bead base 60 to a highest part 78bx of a protruding end surface 78) is set in the range of 50 μm to 150 μm. The thickness of the rubber seal 70 according to the embodiment of the present invention is set to about 72 μm. It should be noted that, for ease of understanding of the present invention, in the cross sectional view of FIG. 2B, the membrane thickness of the rubber seal 70 is depicted in an exaggerated manner.

Further, the rubber seal 70 according to the embodiment of the present invention includes, in a cross sectional view taken along the thickness direction of the metal separator 10 (rubber seal 70), as a cross sectional shape, a first protrusion 72 at the central part in the width direction of the top portion 64 and a second protrusion 74 which is provided outside the first protrusion 72 and covers the first protrusion 72. That is, the rubber seal 70 is formed by forming the first protrusion 72 on the bead base 60 beforehand, and thereafter, forming the second protrusion 74 on the bead base 60 having the first protrusion 72.

The width of the first protrusion 72 in the portion which contacts the upper surface of the top portion 64 (root portion 72a) is large, and the width is decreased from the root portion 72a in the protruding direction. The area around a peak 72b has a circular arc shape. At the time of coating the rubber material in the liquid state, coating is performed in a manner that an inclination angle θ1 of the root portion 72a of the first protrusion 72 with respect to the bead base 60 falls within the range of the angle of repose, and the rubber material is hardened a manner that the first protrusion 72 is kept to have a mountain shape.

In the first protrusion 72, in screen printing, a membrane thickness H1 (protruding height) from the top portion 64 to the peak 72b, and the width W1 of the root portion 72a are regulated to have suitable values. For example, preferably, the proportion of the membrane thickness H1 of the first protrusion 72 to the overall membrane thickness of the rubber seal 70 is set to $2/3$ to $9/10$. In the case where the proportion of the membrane thickness H1 of the first protrusion 72 to the overall membrane thickness of the rubber seal 70 is smaller than $2/3$, there is a possibility that central part in the width direction of the second protrusion 74 is depressed easily, and in the case where the proportion of the membrane thickness H1 of the first protrusion 72 to the overall membrane thickness of the rubber seal 70 is larger than $9/10$, there is a possibility that the second protrusion 74 cannot be formed easily. For example, it is preferable that the specific membrane thickness H1 of the first protrusion 72 is in the range of 40 μm to 70 μm, and is set to about 60 μm in the embodiment of the present invention.

Further, for example, it is preferable that, for example, the width W1 of the root portion 72a of the first protrusion 72 is set in the range of 0.5 mm to 0.9 mm, and is set to 0.7 mm in the embodiment of the present invention. By setting the width W1 of the first protrusion 72 to not more than 0.9 mm, it is possible to form the area around the peak 72b to have a circular arc shape suitably (it is possible to suppress flattening of the area around the peak 72b) when screen printing is performed.

Meanwhile, in the cross sectional view in the thickness direction of the rubber seal 70, the second protrusion 74 is formed to have a substantially trapezoidal shape protruding from the bead base 60 to the height above the first protrusion 72, and covers the entire first protrusion 72. That is, the second protrusion 74 is coated on the first protrusion 72, and formed to become wider than the first protrusion 72. As a result, the second protrusion 74 has a shape where the inside thereof tightly contacts the entire surface of the first protrusion 72. Further, in the cross sectional view, the quantity of the rubber material forming the second protrusion 74 is larger than the quantity of the rubber material forming the first protrusion 72.

The outer surface of the second protrusion 74 includes a pair of inclined side surfaces 76 and the protruding end surface 78 which couples upper ends of the pair of inclined side surfaces 76 together. The roots of the pair of inclined side surfaces 76 are continuous with the pair of inclined portions 62 of the bead base 60 (or the pair of curved portions 64b). For example, an inclination angle θ2 of the root of each of the inclined side surfaces 76 with respect to the flat portion 64a of the bead base 60 is smaller than the inclination angle θ1 of the side surface of the first protrusion 72 (root portion 72a). The pair of inclined side surfaces 76 and the protruding end surface 78 are connected together smoothly by the curved portions.

Although having rises and falls slightly, the protruding end surface 78 of the second protrusion 74 has a substantially flat shape. More specifically, the protruding end surface 78 has a depressed portion 78a slightly depressed toward the bead base 60 in the central part in the width direction, and includes rising portions 78b which rise slightly on both sides in the width direction, respectively. The rising portions 78b are curved smoothly toward the outside in the width direction, and continuous with the pair of inclined side surfaces 76.

The rubber seal 70 includes the first protrusion 72 and the second protrusion 74, whereby a height difference D between a lowest part 78ax of the depressed portion 78a and the highest part 78bx of the pair of rising portions 78b is sufficiently small. For example, the height difference D is not more than about 5% of the membrane thickness of the rubber seal 70 described above. It should be noted that the second protrusion 74 forms outer appearance of the rubber seal 70, and a membrane thickness H2 (protruding height from the top portion 64 to the highest part 78bx) matches the membrane thickness of the rubber seal 70 described above. For example, the distance between the pair of highest parts 78bx (width W2 of the protruding end surface 78 of the second protrusion 74) is in the range of about 1.7 mm to 3.0 mm, and this segment is substantially flat.

The first protrusion 72 and the second protrusion 74 are made of rubber material having the same modulus of elasticity. Examples of rubber materials (resin materials) of the rubber seal 70 include silicone, urethane, thermosetting elastomers such as fluorine, thermoplastic elastomers, or other elastomers, or synthetic rubber, natural rubber, etc. In the embodiment of the present invention, silicone is used as the rubber material.

Further, the first protrusion 72 and the second protrusion 74 have different viscosities (physical properties) in the liquid state at the time of screen printing. That is, at the time of producing the rubber seal 70, the first protrusion 72 is formed of material having first viscosity (hereinafter referred to as the high viscosity resin material), and the second protrusion 74 is formed of material having second viscosity which is lower than the first viscosity (hereinafter referred to as the low viscosity resin material). The difference between the viscosity of the first protrusion 72 and the viscosity of the second protrusion 74 is created by suitably adjusting the amount of viscosity modifier (thickener such as gelatin, diluent such as thinner) used for the rubber material (silicone) as main material of the rubber seal 70. It should be noted that, for example, by evaporation of the viscosity modifier after coating the first protrusion 72 and the second protrusion 74, the first protrusion 72 and the second protrusion 74 may have the same physical property in the state where the rubber seal 70 (seal bead 50) is formed for example.

For example, it is preferable that the viscosity of the high viscosity resin material of the first protrusion 72 is set in the range of 10 Pa·s to 50 Pa·s when the viscosity is measured by a rotational viscometer. On the other hand, it is preferable that the viscosity of the low viscosity resin material of the second protrusion 74 is set in the range of 5 Pa·s to 20 Pa·s when the viscosity is measured by the rotational viscometer. It is not essential that first protrusion 72 and the second protrusion 74 are made of material having different physical properties (e.g., viscosity), and may be made of material having the same physical property.

The metal separator 10 according to the embodiment of the present invention basically has the structure as described above. Hereinafter, a method of producing the metal separator 10 and operation thereof will be described.

Figure 3:
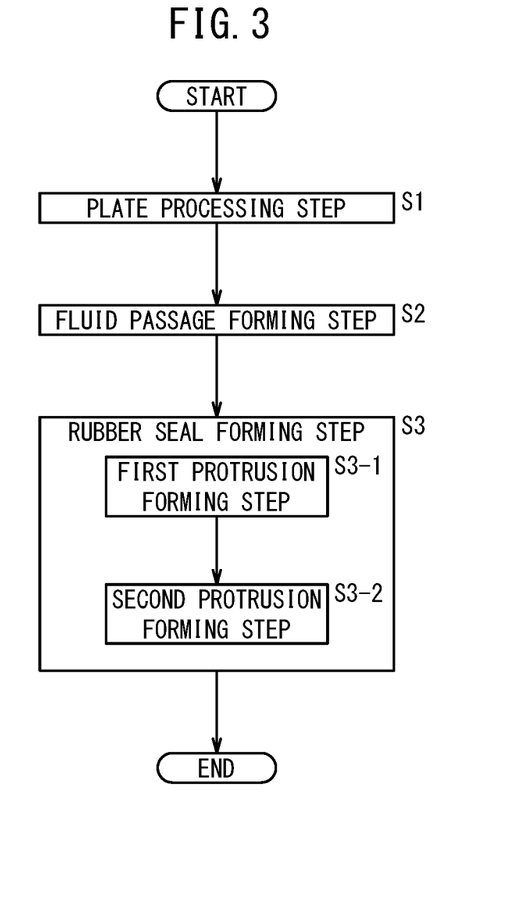
FIG. 3 is a flow chart showing a method of producing a metal separator.

As shown in FIG. 3, in the method of producing the metal separator 10, a plate processing step (step S1), a fluid passage forming step (step S2), and a rubber seal forming step (step S3) are performed successively. Further, in the rubber seal forming step, a first protrusion forming step (step S3-1) and a second protrusion forming step (step S3-2) are performed successively to form the rubber seal 70.

In the plate processing step, a plate (not shown) forming the metal separator 10 is prepared, and this plate is set in a mold die of a pressing machine (not shown). After the plate is set in the mold die, the pressing machine operates the mold die to form the reactant gas flow field 16 of the metal separator 10 and the bead base 60 of the seal bead 50 by press forming. In this manner, the plate after press forming becomes a corrugated plate having corrugation which forms the reactant gas flow field 16 and the bead base 60.

In the fluid passage forming step, the corrugated plate after the plate processing step is set to a cutting machine (not shown). After the corrugated plate is set to the cutting machine, the cutting machine forms the fluid passages 36 penetrating through the corrugated plate by a piercing mold die. It should be noted that, in the production of the metal separator 10, the reactant gas flow field 16 and the bead base 60 may be formed after forming the fluid passages 36 beforehand. Alternatively, press forming (formation of corrugation) and cutting (formation of the fluid passages 36) may be performed at the same time.

Figure 4A:
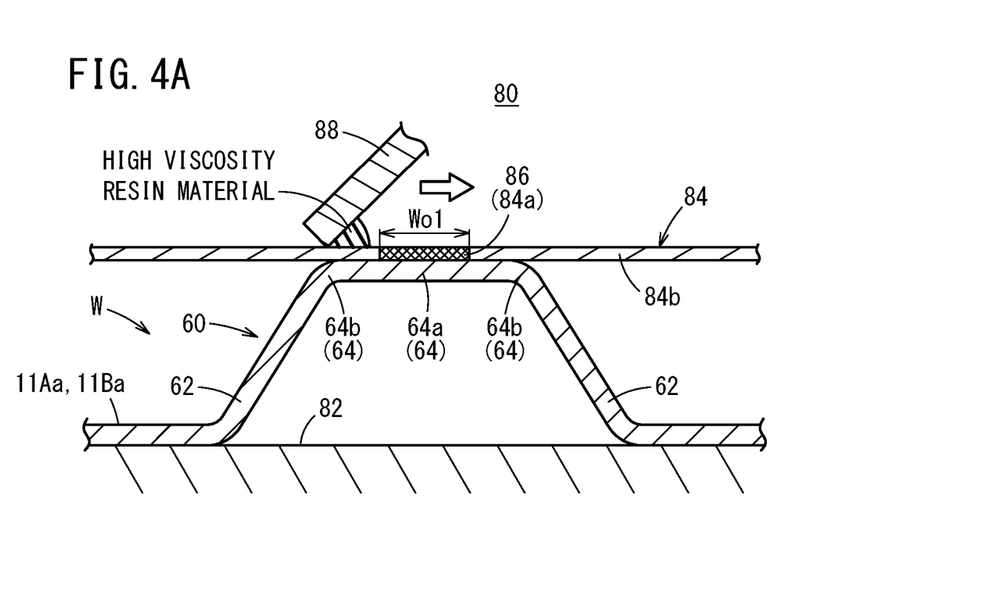
FIG. 4A is a view showing operation of a first protrusion forming step.
Figure 4B:
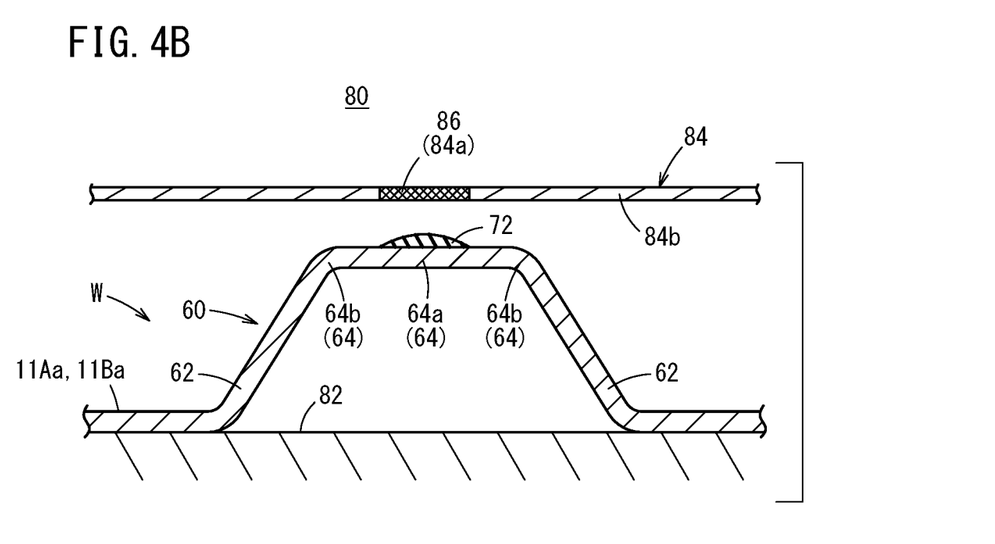
FIG. 4B is a view showing the state where a first protrusion is formed on the bead base.

Then, in the first protrusion forming step, the first protrusion 72 is formed by screen printing on the top portion 64 of the bead base 60 formed in the plate processing step. Specifically, as shown in FIGS. 4A and 4B, a workpiece W (corrugated plate of the metal separator 10 which does not have any rubber seal 70) having corrugation and the fluid passages 36 penetrating therethrough is set onto a printing frame 82 of a first screen printing machine 80. As a result of this setting process, the workpiece W is fixed in the state where the top portion 64 of the bead base 60 is oriented vertically upward.

In the first screen printing machine 80, a first screen 84 (screen plate) for screen printing is disposed above the workpiece W which has been set. The first screen 84 has a first opening 86 (first printing pattern) where a mesh 84a (gauze) is exposed at a position facing the central part in the width direction of the top portion 64 of the bead base 60, and the remaining portion of the mesh 84a is closed by emulsion 84b.

In this state, in the first screen printing machine 80, the high viscosity resin material of the first protrusion 72 is filled on the upper surface of the first screen 84. Then, in the first screen printing machine 80, after filling the high viscosity resin material, a squeegee 88 for pressing the first screen 84 is disposed on the upper surface of the first screen 84, and the squeegee 88 is moved in a surface direction (e.g., in a direction indicated by the arrow B in FIG. 1) of the first screen 84.

During movement, the squeegee 88 presses the first screen 84 downward, and slides on the first screen 84. When the first screen 84 adjacent to the first opening 86 is pressed by the squeegee 88, the first screen 84 contacts the top portion 64 of the bead base 60, and the squeegee 88 pushes the high viscosity resin material toward the first opening 86 (exposed mesh 84a). Then, after the squeegee 88 passes through the first opening 86, and the first screen 84 adjacent to the first opening 86 moves away from the top portion 64 of the bead base 60, the high viscosity resin material is coated on the top portion 64 of the bead base 60.

Thus, in the workpiece W after the first protrusion forming step, the first protrusion 72 is present on the top portion 64 of the bead base 60. As described above, the high viscosity resin material of the first protrusion 72 has high viscosity, e.g., set in the range of 10 Pa·s to 50 Pa·s when the viscosity is measured by the rotational viscometer. As a result, it is possible to maintain the mountain shape of the first protrusion 72 stably after coating the high viscosity resin material as well. In the first protrusion forming step, filling of the high viscosity resin material and movement of the squeegee 88 in the surface direction of the first screen 84 may be performed multiple times.

Figure 5A:
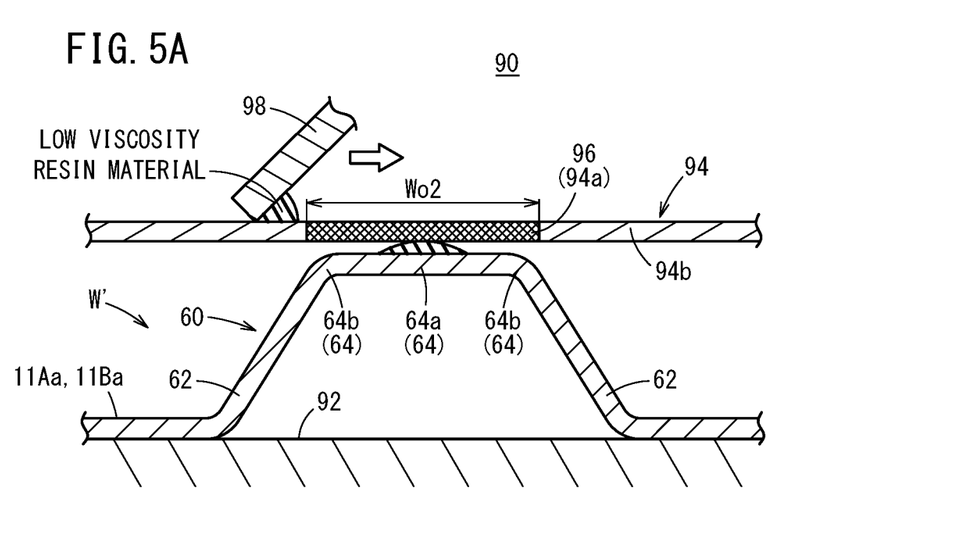
FIG. 5A is a view showing operation of a second protrusion forming step.

Further, in the second protrusion forming step, the second protrusion 74 is formed by screen printing, on the bead base 60 having the first protrusion 72 on the top portion 64. Specifically, as shown in FIG. 5A, a workpiece W' after the first protrusion forming step is set onto a printing frame 92 of a second screen printing machine 90, and is fixed in a manner that the first protrusion 72 on the bead base 60 is oriented vertically upward. It should be noted that the first screen printing machine 80 may be used as the second screen printing machine 90, while changing the screen and/or rubber material used for coating.

In the second screen printing machine 90, a second screen 94 for screen printing is disposed above the workpiece W' which has been set. The second screen 94 has a second opening 96 (second printing pattern) where a mesh 94a (gauze) is exposed at a position facing the top portion 64 of the bead base 60, and the remaining portion of the mesh 94a is closed by emulsion 94b.

In this case, the first opening 86 and the second opening 96 have the same shape in the central part in the width direction, and face the bead base 60, respectively. A width Wo2 of the second opening 96 is larger than a width Wo1 of the first opening 86 of the first screen 84. Further, the thickness of the second screen 94 (second opening 96) is configured to be larger than the thickness of the first screen 84 (first opening 86). Further, the opening ratio of the mesh 94a of the second opening 96 is configured to be larger than the opening ratio of the mesh 84a of the first opening 86. In the second screen printing machine 90, the low viscosity resin material of the second protrusion 74 is filled on the upper surface of the second screen 94. Then, in the second screen printing machine 90, after filling the low viscosity resin material, a squeegee 98 for pressing the second screen 94 is disposed on the upper surface of the second screen 94, and the squeegee 98 is moved in a surface direction of the second screen 94. For example, the moving direction of the squeegee 98 is set to the same direction (e.g., in the direction indicated by the arrow B in FIG. 1) as the moving direction of the squeegee 88 of the first screen printing machine 80. It should be noted that the moving direction of the squeegee 98 may be different from the moving direction of the squeegee 88.

Figure 5B:
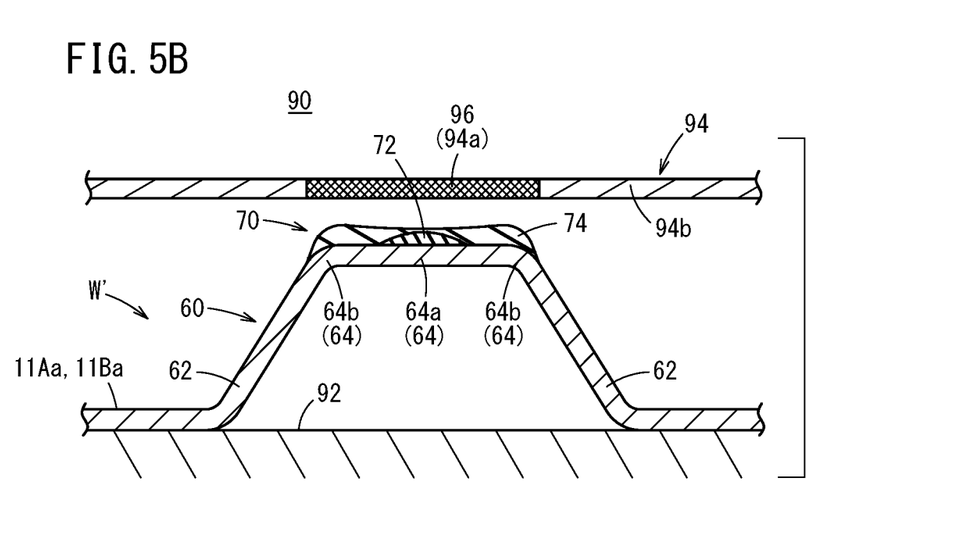
FIG. 5B is a view showing the state where the second protrusion is formed on the bead base.

During movement, the squeegee 98 presses the second screen 94 downward, and slides on the second screen 94. When the second screen 94 adjacent to the second opening 96 is pressed by the squeegee 98, the second screen 94 contacts the bead base 60 and the first protrusion 72, and the squeegee 98 pushes the low viscosity resin material toward the second opening 96 (exposed mesh 94a). Then, after the squeegee 98 passes through the second opening 96, and the second screen 94 adjacent to the second opening 96 moves away from the bead base 60, the low viscosity resin material covers the entire first protrusion 72, and the second protrusion 74 coated on the bead base 60 is formed.

As described above, the viscosity of the low viscosity resin material of the second protrusion 74 is lower than the viscosity of the high viscosity resin material of the first protrusion 72, and, e.g., is set in the range of 5 Pa·s to 20 Pa·s when the viscosity is measured by the rotational viscometer. Accordingly, the low viscosity resin material is spread easily in the width direction of the bead base 60, and coated uniformly all over the bead base 60 and the first protrusion 72. It should be noted that, also in the second protrusion forming step, filling of the low viscosity resin material and movement of the squeegee 98 in the surface direction of the second screen 94 may be performed multiple times.

In the rubber seal 70 on the metal separator 10 formed by the above production method, the first protrusion 72 formed of the high viscosity resin material functions as core material which supports the central part in the width direction of the second protrusion 74 made of the low viscosity resin material. Next, the performance of the rubber seal 70 according to the present invention formed by the above production method will be described by comparison with a rubber seal 100 according to a comparative example shown by a two dot chain line in FIG. 6. The rubber seal 100 according to the comparative example is formed by ejecting rubber material on the bead base 60 by performing one-time screen printing to form the rubber seal 100 having a predetermined membrane thickness (to have the same membrane thickness as the rubber seal 70).

Figure 6:
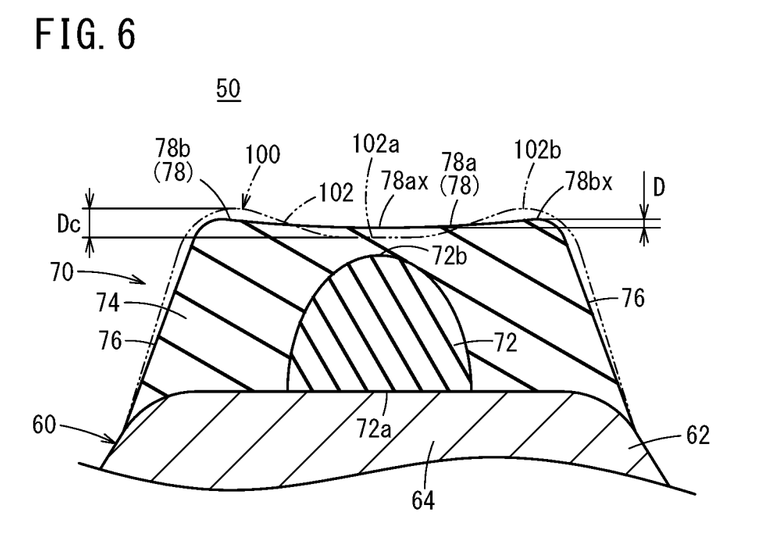
FIG. 6 is a cross sectional view schematically showing a rubber seal of the present invention and a rubber seal of a comparative example for comparison with each other.

In this case, in a screen (not shown) of screen printing in the comparative example, an opening is configured to have a wide size, and the aperture ratio of the mesh is set to a large value. Therefore, during movement of the squeegee on the opening of the screen of the comparative example, the mesh at the central part in the width direction is deformed downward easily. As a result, in the rubber seal 100, a phenomenon (so called saddle phenomenon) where a lowest part 102a of the central part in the width direction of a protruding end surface 102 gets lower and highest parts 102b on both sides in the width direction get higher occurs. That is, in the rubber seal 100, the height difference Dc between the lowest part 102a and the highest parts 102b become large.

In contrast, in the rubber seal 70 of the present invention, the first protrusion 72 is formed at the central part in the width direction of the bead base 60 by the first screen printing, and the second protrusion 74 covering the first protrusion 72 is formed by the second screen printing. Therefore, since the second opening 96 of the second screen 94 is configured to have a wide size, even if the extruded resin material becomes small at the central part in the width direction of the second opening 96, the thickness of the rubber seal 70 at the central part in the width direction is compensated by the first protrusion 72. Thus, the height difference D of the protruding end surface 78 of the rubber seal 70 becomes small, and the protruding end surface 78 is formed to have a substantially flat shape. That is, in the rubber seal 70 according to the embodiment of the present invention, it is possible to improve the seal performance of the seal bead 50 for the resin frame equipped MEA 14.

It should be noted that the present invention is not limited to the above-described embodiment. Various modifications can be made in line with the gist of the present invention. For example, the rubber material (resin material) of the first protrusion 72 and the rubber material (resin material) of the second protrusion 74 may have different moduli of elasticity. For example, the first protrusion 72 may be made of resin material having low modulus of elasticity, and the second protrusion 74 may be made of resin material having high modulus of elasticity. Further, for example, the cross sectional shape of the first protrusion 72 is not limited specially as long as it is tapered, and may be a trapezoidal shape, for example.

Second Embodiment

Figure 7A:
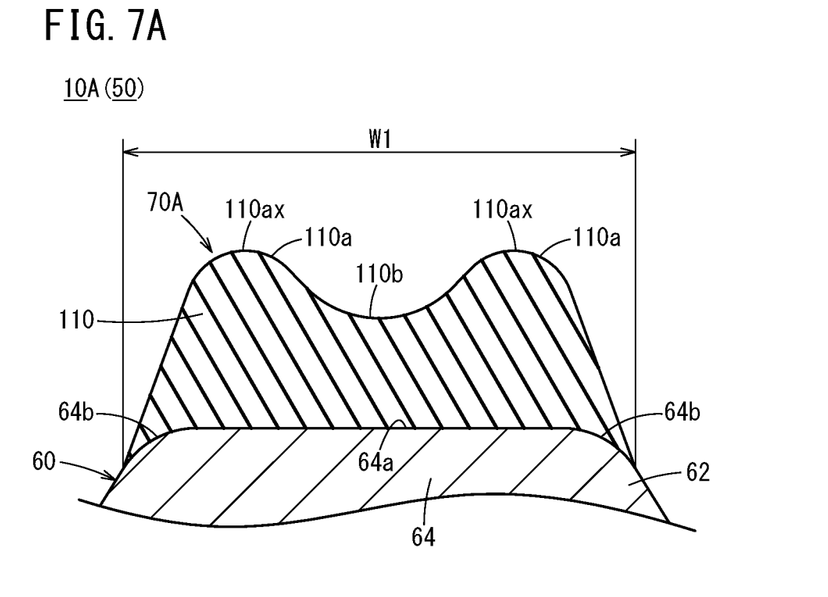
FIG. 7A is a cross sectional view schematically showing a state where a protrusion of a seal bead according to a second embodiment of the present invention is formed on a bead base.
Figure 7B:
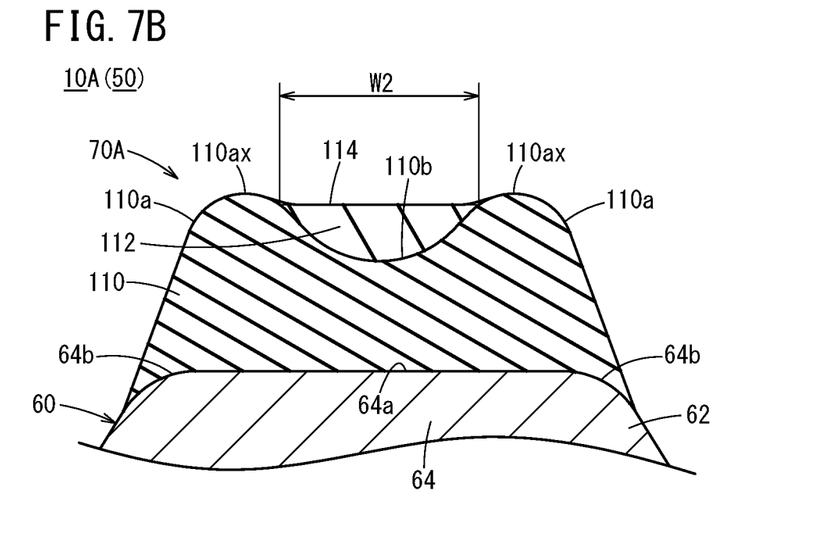
FIG. 7B is a cross sectional view schematically showing a state where the seal bead in FIG. 7A is formed on the bead seal.

In a metal separator 10A according to a second embodiment shown in FIGS. 7A and 7B, a rubber seal 70A is provided on the bead base 60 in the same manner as in the case of the metal separator 10 described above. However, the rubber seal 70A has a wide protrusion 110 and a narrow filler portion 112 at the central part in the width direction of the protrusion 110. In this respect, the rubber seal 70A is different from the rubber seal 70 described above. That is, in the rubber seal 70A, the quantity of resin material used for coating of the protrusion 110 is smaller than the quantity of resin material used for coating of the filler portion 112.

Specifically, the protrusion 110 is coated on the bead base 60 before coating the filler portion 112. The protrusion 110 is coated in the width direction of the top portion 64, and the root portion thereof is configured to cover the entire top portion 64 in the width direction (between the pair of curved portions 64b). The width W1 of the root portion of the protrusion 110 is set in the range of about 1.7 mm to 3.0 mm. In the cross sectional view taken along the thickness direction of the metal separator 10A (rubber seal 70A), the upper portion of the protrusion 110 is configured such that rising portions 110a are provided on both sides in the width direction, and a depressed portion 110b is provided at the central part in the width direction, between the pair of rising portions 110a.

The protrusion 110 is made of resin material having high viscosity. The viscosity is, e.g., set in the range of 10 Pa·s to 50 Pa·s when the viscosity is measured by the rotational viscometer. The protrusion 110 is coated on the top portion 64 using a first screen plate (first screen printing machine) (not shown) having a mesh of the same width as the top portion 64 of the bead base 60. As a result, the pair of rising portions 110a and the depressed portion 110b are formed as described above after coating (saddle phenomenon).

On the other hand, the filler portion 112 is coated on the depressed portion 110b of the protrusion 110 to cover the depressed portion 110b. The upper portion of the filler portion 112 has substantially the same height as highest parts 110ax of the pair of rising portions 110a on both sides of the depressed portion 110b (or slightly lower than the highest parts 110ax). The width W2 of the upper portion of the filler portion 112 is set in the range of, e.g., about 0.6 mm to 1.2 mm, and set to 0.9 mm in the embodiment of the present invention.

The filler portion 112 is made of low viscosity resin material having lower viscosity than the protrusion 110. The viscosity is, e.g., set in the range of 5 Pa·s to 20 Pa·s when the viscosity is measured by the rotational viscometer. The filler portion 112 is coated on the protrusion 110 using a second screen plate (second screen printing machine) (not shown) having a mesh of narrower width than the top portion 64 of the bead base 60.

The filler portion 112 is coated within the depressed portion 110b of the protrusion 110 where the central part is depressed deeply. Thus, the thickness of the central part is increased naturally, and the filler portion 112 is formed to have a shape protruding downward (toward the top portion 64). Therefore, the upper portion of the filler portion 112 is formed to have a substantially flat shape between the pair of rising portions 110a. That is, a protruding end surface 114 of the rubber seal 70A includes the pair of rising portions 110a and the filler portion 112, and is formed to have a substantially flat shape.

As described above, in the rubber seal 70A of the metal separator 10A according to the second embodiment, the filler portion 112 is coated in a manner to compensate for the thickness at the central part of the protrusion 110 having the depressed portion 110b. Therefore, also in the rubber seal 70A, the protruding end surface 114 has a substantially flat shape, and it is possible to improve the seal performance of the seal bead 50 for the resin frame equipped MEA 14.

The technical concepts and advantages which can be understood from the above embodiments will be described below.

According to a first aspect of the present invention, the metal separator 10 to be applied to the fuel cell 12 is provided. The metal separator 10 includes the bead base 60 protruding from the surface 11Aa, 11Ba of the metal separator 10, and formed integrally with the metal separator 10, and the rubber seal 70 provided on the bead base 60. In a cross sectional view taken along a thickness direction of the rubber seal 70, the rubber seal 70 includes the first protrusion 72 at the central part in the width direction of the top portion 64 of the bead base 60, and the second protrusion 74 provided outside the first protrusion 72 and configured to cover the first protrusion 72.

In the metal separator 10, since the rubber seal 70 includes the first protrusion 72 and the second protrusion 74, it is possible to form the thick rubber seal 70 and achieve suitable flatness of the protruding end surface 78. That is, the first protrusion 72 formed on the top portion 64 of the base bead 60 supplements the shortage of the resin material at the central part in the width direction of the second protrusion 74, and supports the inside the second protrusion 74. As a result, the second protrusion 74 has the sufficient thickness, and the central part in the width direction of the protruding end surface 78 is not depressed significantly. By adopting the structure, in the metal separator 10, it is possible to obtain the suitable seal performance of the rubber seal 70, and greatly improve the power generation performance of the fuel cell 12 to which the metal separator 10 is applied.

Further, the first protrusion 72 and the second protrusion 74 have the same modulus of elasticity. As a result, also in the structure where the rubber seal 70 has the first protrusion 72 and the second protrusion 74, the two protrusions can exert the same seal performance, and it becomes possible to stabilize the seal performance of the entire seal bead 50.

Further, the protruding end surface 78 of the second protrusion 74 includes the depressed portion 78a at the center in the width direction, and rising portions 78b on both sides in the width direction. The height difference D between the lowest part 78ax of the depressed portion 78a and the highest part 78bx of the rising portions 78b is not more than 5% of the thickness of the rubber seal 70. By adopting the structure, in the rubber seal 70, it is possible to sufficiently achieve the flatness of the protruding end surface 78, and stabilize the seal performance of the metal separator 10 to a greater extent.

Further, the rubber seal 70 is formed by screen printing, and the thickness of the rubber seal 70 is set in the range of 50 μm to 150 μm. In this manner, also in the case of forming the rubber seal 70 having a relatively large thickness of 50 μm to 150 μm by screen printing, it is possible to achieve suitable flatness of the protruding end surface of the rubber seal 70 by the first and second protrusions 72, 74.

Further, according to a second aspect of the present invention, the metal separator 10A to be applied to the fuel cell 12 is provided. The metal separator 10A includes the bead base 60 protruding from a surface of the metal separator 10A, and formed integrally with the metal separator 10A, and the rubber seal 70A provided on the bead base 60. In a cross sectional view taken along a thickness direction of the rubber seal 70A, the rubber seal 70A includes the protrusion 110 over the top portion 64 of the bead base 60 entirely in the width direction, the depressed portion 110b is formed at an upper and widthwise central part of the protrusion 110, and the rubber seal 70A includes the filler portion 112 configured to cover the depressed portion 110b. In this manner, also in the case of the rubber seal 70A having the protrusion 110 and the filler portion 112, it is possible to achieve the stable and suitable seal performance, and greatly improve the power generation performance of the fuel cell 12 to which the metal separator 10A is applied.

Further, according to a third aspect of the present invention, the method of producing the metal separator 10 to be applied to the fuel cell 12 is provided. The method includes a plate processing step of forming the bead base 60 protruding from the surface 11Aa, 11Ba of the metal separator 10, and formed integrally with the metal separator 10, and a rubber seal forming step of providing the rubber seal 70 by screen printing for the bead base 60 formed in the plate processing step. The rubber seal forming step includes a first protrusion forming step of forming the first protrusion 72 at the central part in the width direction of the top portion 64 of the bead base 60, in a cross sectional view taken along a thickness direction of the rubber seal 70, and a second protrusion forming step of forming the second protrusion 74 provided outside the first protrusion 72, and configured to cover the first protrusion 72, after the first protrusion forming step. In the metal separator 10 produced in this manner, it is possible to form the thick rubber seal 70 and achieve suitable flatness of the protruding end surface 78, to thereby allow the rubber seal 70 to exert the stable seal performance.

Further, in the first protrusion forming step, the first protrusion 72 is formed using resin material having first viscosity, and in the second protrusion forming step, the second protrusion 74 is formed using resin material having second viscosity which is lower than the first viscosity. In this manner, in the rubber seal 70, it is possible to suitably maintain the protruding shape of the first protrusion 72, and support the inner side of the second protrusion 74 by the first protrusion 72.

What is claimed is:

1. A metal separator to be applied to a fuel cell, the metal separator comprising:
   a bead base protruding from a surface of the metal separator, and formed integrally with the metal separator; and
   a rubber seal provided on the bead base,
   wherein, in a cross sectional view taken along a thickness direction of the rubber seal, the rubber seal includes a first protrusion at a central part in a width direction of a top portion of the bead base, and a second protrusion provided outside the first protrusion and configured to cover the first protrusion,
   wherein a protruding end surface of the second protrusion includes a depressed portion at a center in the width direction, and rising portions on both sides in the width direction,
   and wherein a height difference between a lowest part of the depressed portion and a highest part of the rising portions is not more than 5% of a thickness of the rubber seal.

2. The metal separator according to claim 1, wherein the first protrusion and the second protrusion have an identical modulus of elasticity.

3. The metal separator according to claim 1, wherein the rubber seal is formed by screen printing, and a thickness of the rubber seal is set in a range of 50 μm to 150 μm.

4. A metal separator to be applied to a fuel cell, the metal separator comprising:
   a bead base protruding from a surface of the metal separator, and formed integrally with the metal separator; and
   a rubber seal provided on the bead base,
   wherein, in a cross sectional view taken along a thickness direction of the rubber seal, the rubber seal includes a protrusion over a top portion of the bead base entirely in a width direction of the top portion,
   a depressed portion is formed at an upper and widthwise central part of the protrusion, and
   the rubber seal includes a filler portion configured to cover the depressed portion.

5. A metal separator to be applied to a fuel cell, the metal separator comprising:
   a main separator body formed from a metal plate and including a flattened base portion;
   a bead base protruding from the flattened base portion of the main separator body, and formed integrally therewith; and
   a rubber seal provided on the bead base,
   wherein, in a cross sectional view taken along a thickness direction of the rubber seal, the rubber seal includes a first protrusion at a central part in a width direction of a top portion of the bead base, and a second protrusion provided outside the first protrusion and configured to cover the first protrusion,
   wherein a protruding end surface of the second protrusion includes a depressed portion at a center in the width direction, and rising portions on both sides in the width direction,
   and wherein a height difference between a lowest part of the depressed portion and a highest part of the rising portions is not more than 5% of a thickness of the rubber seal.

* * * * *